(12) United States Patent
Van Bree et al.

(10) Patent No.: US 11,100,360 B2
(45) Date of Patent: Aug. 24, 2021

(54) TRACKING A HEAD OF A SUBJECT

(71) Applicant: KONINKLIJKE PHILIPS N.V., Eindhoven (NL)

(72) Inventors: Karl Catharina Van Bree, Eindhoven (NL); Leo Jan Velthoven, Wintelre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 63 days.

(21) Appl. No.: 16/467,531

(22) PCT Filed: Dec. 12, 2017

(86) PCT No.: PCT/EP2017/082453
§ 371 (c)(1),
(2) Date: Jun. 7, 2019

(87) PCT Pub. No.: WO2018/108926
PCT Pub. Date: Jun. 21, 2018

(65) Prior Publication Data
US 2019/0325256 A1   Oct. 24, 2019

(30) Foreign Application Priority Data
Dec. 14, 2016 (EP) ..................................... 16204084

(51) Int. Cl.
*G06K 9/62* (2006.01)
*G06K 9/00* (2006.01)

(52) U.S. Cl.
CPC ......... *G06K 9/621* (2013.01); *G06K 9/00208* (2013.01); *G06K 9/00248* (2013.01); *G06K 9/00261* (2013.01)

(58) Field of Classification Search
CPC ........... G06K 9/00208; G06K 9/00248; G06K 9/00261; G06K 9/621; G06K 9/72;
(Continued)

(56) References Cited

U.S. PATENT DOCUMENTS 9,104,908 B1    8/2015 Rogers
9,292,734 B2 *  3/2016 Zhu .......................... G06T 7/75
(Continued)

FOREIGN PATENT DOCUMENTS

EP    2017/082453    12/2017
WO    2004/003849    1/2004

OTHER PUBLICATIONS

Chang, T-H., and Shaogang Gong. "Tracking multiple people with a multi-camera system." Proceedings 2001 IEEE Workshop on Multi-Object Tracking. IEEE, 2001. (Year: 2001).*
(Continued)

*Primary Examiner* — Bobbak Safaipour

(57) ABSTRACT

An apparatus and method for tracking a head of a subject in a series of images includes receiving a series of images of at least a portion of a subject's head; tracking a position of the subject's head in the series of images based on positions of a first plurality of primary features of the subject's head; determining a first confidence level of the position of the subject's head based on the positions of the first plurality of primary features; monitoring a position of a secondary feature; and upon determining that the first confidence level is below a defined threshold, tracking the position of the subject's head based on the position of the secondary feature rather than the positions of the primary features.

20 Claims, 6 Drawing Sheets

(58) Field of Classification Search
CPC . G06T 2207/10016; G06T 2207/10024; G06T 2207/30201; G06T 7/246
See application file for complete search history.

(56) References Cited

U.S. PATENT DOCUMENTS

| | | | |
|---|---|---|---|
| 2003/0154084 A1* | 8/2003 | Li | G06K 9/00228 704/273 |
| 2011/0081052 A1 | 4/2011 | Bigioi | |
| 2012/0314904 A1 | 12/2012 | Hamada | |
| 2015/0049176 A1* | 2/2015 | Hinnen | H04N 13/305 348/59 |
| 2015/0243031 A1 | 8/2015 | Narasimha | |
| 2017/0131763 A1* | 5/2017 | Sakuta | G06F 3/0488 |
| 2018/0137632 A1* | 5/2018 | Takada | G06T 3/00 |
| 2020/0169724 A1* | 5/2020 | Meglan | A61B 34/76 |

OTHER PUBLICATIONS

Niyogi, Sourabh, and William T. Freeman. "Example-based head tracking." Proceedings of the second international conference on automatic face and gesture recognition. IEEE, 1996. (Year: 1996).*
Grabner, et al., "Tracking the invisible: Learning where the object might be", 2010 IEEE Conference on Computer Vision and Pattern Recognition.
Xiong, et al., "Dynamic Context for Tracking behind Occlusions", Computer Vision ECCV 2012.
Yang, et al., "Context-Aware Visual Tracking", IEEE Transactions on Pattern Analysis and Machine Intelligence, vol. 31, No. 7, Jul. 1, 2009.
Cerman, et al., "Sputnik Tracker: Having a Companion Improves Robustness of the Tracker", Jun. 15, 2009.
Ahlberg, et al., "Handbook of face recognition, Chapter 4, Parametric Face Modeling and Tracking", Jan. 1, 2005.
International Search Report and Written Opinion dated Apr. 16, 2018 for International Application No. PCT/EP2017/082453 filed Dec. 12, 2017.

* cited by examiner

TRACKING A HEAD OF A SUBJECT

CROSS REFERENCE TO RELATED APPLICATIONS

This application is the U.S. National Phase application under 35 U.S.C. § 371 of International Application No. PCT/EP2017/082453 filed Dec. 12, 2017, published as WO 2018/108926 on Jun. 21, 2018, which claims the benefit of European Patent Application Number 16204084.4 filed Dec. 14, 2016. These applications are hereby incorporated by reference herein.

FIELD OF THE INVENTION

The invention relates to tracking a head of a subject and, more particularly to tracking a head of a person based on a position of a primary feature and/or a position of a secondary feature of subject's head.

BACKGROUND OF THE INVENTION

When performing a personal care activity, such as applying make-up, performing a skin care activity, shaving or hair trimming, a user may use a smart mirror having a camera or an imaging device having a camera, such as a tablet computer or smart phone, to provide guidance and/or feedback regarding the activity. For example, an application running on a tablet computer may be used to provide guidance to a user when shaving or trimming a particular style into the user's facial hair. In such an example, the tablet computer may track the user's face in real time so that it is able to provide real time guidance to the user.

SUMMARY OF THE INVENTION

Tracking a head of subject, such as the head of a person performing a personal care activity, may be difficult if the head moves significantly with respect to a camera of the device used for tracking, if portions of the head are moved out of the field of view of the camera, or if portions of the head are obscured from view of the camera. A tracking device that relies on accurate tracking data may not be able to provide reliable guidance to the user if such tracking data is unavailable.

Therefore, there exists a need for a more reliable method for tracking a head of a subject if the position of the head relative to the tracking device is suboptimal.

According to a first aspect, there is provided a method for tracking a head of a subject in a series of images. The method comprises receiving a series of images of at least a portion of a subject's head; tracking a position of the subject's head in the series of images based on positions of a first plurality of primary features of the subject's head; determining a first confidence level of the position of the subject's head based on the positions of the first plurality of primary features; monitoring a position of a secondary feature; and upon determining that the first confidence level is below a defined threshold, tracking the position of the subject's head based on the position of the secondary feature rather than the positions of the primary features. In this way, a tracking apparatus performing the method may continue to track the head of the subject in the event that the primary features used for tracking are unavailable (e.g. not visible). The position of the head of the subject may be defined by the positions of a plurality of features of the head (e.g. facial features), namely the primary features of the head. If positions of sufficient primary features of the head are known, then the position of any feature of the head may be determinable. Similarly, the position of the head may be determinable if a sufficient number of features of the image (i.e. secondary features) can be determined. Tracking the head based on primary features is considered to be generally more reliable than tracking the head based on secondary features. Primary feature tracking may be performed using established, reliable techniques, and the primary features may be easily identifiable, generic features of the head that consistently appear in the same positions relative to one another. Secondary features may be person-specific features which are identified in images of the head to be tracked, but which may not be present in images of the heads of all people.

The position of the secondary feature may be monitored relative to one or more of the first plurality of primary features.

For a particular image in the series of images, the first confidence level may in some embodiments, be determined to be below the defined threshold if fewer than a defined number of primary features are visible in the particular image. Such a scenario may occur, for example, if some primary features are obscured from view of the tracking apparatus by an object, or if some primary features are outside the field of view of the tracking apparatus.

In some embodiments, the method may further comprise: during said tracking the position of the subject's head based on the position of the secondary feature, monitoring positions of a second plurality of primary features of the subject's head. The method may comprise determining a second confidence level of the position of the subject's head based on the positions of the second plurality of primary features. Upon determining that the second confidence level is above a defined threshold, the method may track a position of the subject's head based on the positions of the second plurality of primary features rather than the position of the secondary feature. Thus, if the tracking apparatus is tracking the head based on secondary features, and it determines that it is able to track the head based on primary features instead, then the apparatus can switch back to the more reliable primary feature tracking.

The method may further comprise: during said tracking the position of the subject's head based on the positions of the primary features, identifying a candidate secondary feature as a potential secondary feature to be used for tracking the subject's head. In this way, the tracking apparatus may 'learn' new secondary features to be used for tracking, while it is confidently tracking the head on the basis of the primary features.

According to some embodiments, the method may further comprise determining a confidence level of the position of the candidate secondary feature based on the position one or more of the first plurality of primary features. Upon determining that the confidence level of the position of the candidate secondary feature is below a defined threshold, the method may discard the candidate secondary feature as a potential secondary feature to be used for tracking the subject's head. By discarding candidate secondary features whose positions are not known with a high confidence level based on the positions of the primary features, the tracking apparatus can avoid inaccurate tracking of the head, which might occur if inaccurate positions of secondary features were to be used. The confidence level of the position of a candidate secondary feature may be determined, at least in part, by a level of agreement between a predicted position of the candidate secondary feature on a three-dimensional model of the subject's head, based on the known position of a primary feature, and the position as determined in a two-dimensional captured image of the subject's head.

The method may further comprise fitting a three-dimensional model of the subject's head to coordinates representing the positions of the primary features; updating the position of the three-dimensional model based on the positions of the primary features obtained from a first image and a second, later image in the plurality of images; and predicting the position of the candidate secondary feature in the three-dimensional model based on the positions of the primary features in the model.

In some embodiments, the method may comprise comparing the predicted position of the candidate secondary feature in the three-dimensional model with a position of the candidate secondary feature determined from image feature tracking analysis of the first and second images; and increasing a confidence level of the position of the candidate secondary feature if the predicted position is within a defined distance of the position determined from the image feature tracking analysis. In some embodiments, the image feature tracking analysis may comprise optical flow analysis. In other embodiments, the predicted position of the candidate secondary feature in the three-dimensional model may be compared with a position of the candidate secondary feature determined from an image feature tracking or learning method other than optical flow analysis.

The method may further comprise monitoring, over a plurality of images in the series of images, a position of the candidate secondary feature relative to one or more of the first plurality of primary features. Upon determining that (i) the position of the candidate secondary feature relative to the one or more primary features is consistent over the plurality of images, and (ii) the first confidence level is above a defined threshold, the method includes extracting, from a first image of the series of images, data identifying at least one characteristic relating to an image patch containing the candidate secondary feature; and storing said data. In this way, the method can "learn" secondary features that are suitable for tracking the head. A secondary feature will only be used if the positions of the primary features are confident, and if the position of the secondary feature is consistent over a number of images. The primary features can be said to supervise the learning of the secondary features.

The method may further comprise identifying, based on the at least one characteristic, the image patch in a second, later image of the series of images.

Each primary feature may comprise one of: a portion of an eye, a portion of a nose, a portion of a mouth, a portion of an eyebrow, and a portion of a chin. Such primary features may be called generic face features, as the heads of most people include such easily-identifiable features.

In some embodiments, the secondary feature may comprise a portion of an image of the received series of images. Such a portion may be known as an image patch.

Tracking the position of the subject's head based on the position of the secondary feature may comprise applying at least one of a template matching technique and an image feature matching technique.

According to a second aspect, there is provided a processing unit configured to perform the method described above.

According to a third aspect, there is provided an apparatus for tracking a head of a subject. The system comprises an imaging unit for receiving a series of images representing at least a portion of a subject's head; and a processing unit as described above.

The apparatus may further comprise a camera for capturing the image data representing at least a portion of the subject's head.

In some embodiments, the apparatus may comprise one of a smart mirror, a tablet computer, a smartphone, a laptop computer and a desktop computer.

According to a fourth aspect, there is provided a machine-readable medium comprising instructions which, when executed by a processor, cause the processor to track a position of a subject's head in a series of images based on positions of a first plurality of primary features of the subject's head; determine a first confidence level of the position of the subject's head based on the positions of the first plurality of primary features; and upon determining that the first confidence level is below a defined threshold, track the position of the subject's head based on a position of a secondary feature rather than the positions of the primary features.

The machine-readable medium may comprise instructions which, when executed by a processor, cause the processor to: monitoring positions of a second plurality of primary features of the subject's head while tracking the position of the subject's head based on the position of the secondary feature; determine a second confidence level of the position of the subject's head based on the positions of the second plurality of primary features; and upon determining that the second confidence level is above a defined threshold, track a position of the subject's head based on the positions of the second plurality of primary features rather than the position of the secondary feature.

These and other embodiments of the invention will become apparent from and elucidated with reference to the embodiments described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
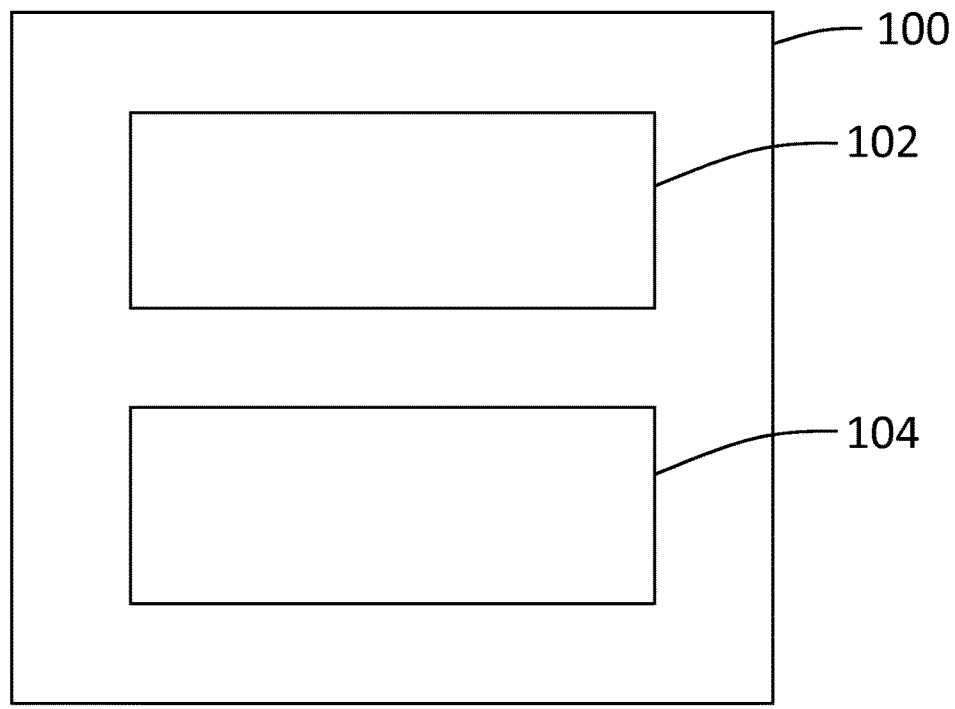
FIG. 1 is a schematic illustration of an example of tracking apparatus according to embodiments of the invention.

Amongst other purposes, the invention may, in some examples, be used to improve tracking of a user, or a portion thereof, using an imaging device while performing a personal care activity. For example, the invention may be implemented when performing personal care activities including, but not limited to make-up application, make-up removal, skin care, hair care, oral care and hair removal activities, such as shaving, epilating, trimming and skin sensing.

When performing a personal care activity, such as shaving, a user may use a guidance system to provide guidance. Such a guidance system may include a camera associated with or coupled to a computing device, such as a smart mirror or a tablet computer. As a user performs the shaving activity in front of the camera, the guidance system may provide guidance to the user, for example in the form of a guidance indicator to be displayed on a display screen associated with the device (for example, on the screen of a smart mirror or on the display screen of the computing device). The guidance indicator may include a line, an image or a series of dots indicating, for example, areas of the user that should be shaved and areas that should not be shaved. Such a system may also enable a user to indicate a particular area of his or her head to the guidance system, and/or may serve as a user interface.

In such a guidance system, image data representing the user (or a portion of the user) is received via the camera in the form of a series of images, and the image data is processed using processing apparatus associated with the system. A guidance indicator may then be generated and displayed along with or superimposed over an image of the user. In order for the guidance system to provide accurate guidance to the user, the camera needs to be able to image the user so that the portion of the user to be treated (e.g. the user's head) can be tracked. In some guidance systems, such tracking is performed by a tracking system which detects a particular feature on the user and tracks that feature as the user moves. However, the particular feature being tracked by the tracking system may be moved into a position such that the system is unable to track its position for a period of time.

According to the invention, a head of a subject, such as a head of a person performing a personal care activity may be tracked using two levels, or regimes, of tracking. A first tracking regime tracks the head of a person using a plurality of primary features, and a second tracking regime tracks the head of the person using one or more secondary features. In the context of this disclosure, a primary feature is a feature of the person's head that is likely to be present and detectable on the heads of most people. For example, in the scenario of a person using a tracking system to aid facial hair trimming, primary features of the person's head include at least portions of the person's eyes, eyebrows, nose and mouth, and the edges of the person's face or head. More specifically, the primary features might include points at ends or corners of particular facial features, such as the corners of the eyes, the ends of the eyebrows, and the corners of the mouth. The primary features might also include points on edges of particular facial features, such as points along the outer edges of the nose, the edges of the mouth or lips, the edges of eyes, and the edges of the chin. In this way, primary features may be considered to be generic features of a person's head or face, which are likely to be present and visible on the heads of most people. Data describing a set of defined primary features may be provided to a tracking apparatus to enable the tracking apparatus to track those primary features. For example, data may be provided which describes or defines the shape and/or appearance of a subject's eye, nose or mouth, or a portion thereof. With knowledge of what the primary features should look like, a tracking apparatus is able to identify them in an image of a subject's head with high confidence.

Tracking the head using the primary features may be performed using known tracking techniques. An example of a known tracking techniques involves fitting a defined three-dimensional model of a head (e.g. an active shape model, or ASM) to a two-dimensional image of the head (e.g. an image of the series of images, or video, captured by the camera). Such a model of a head may use a basic, approximate head model, parameters of which are adjusted to fit the model to the head as it appears in the captured image, to better approximate the head to be tracked. The three-dimensional model is also fitted to positions of features of a subject's head and face (i.e. primary features), for example by adjusting parameters of the model. Tracking the head using the primary features involves identifying the known primary features in a captured image of the head, and updating the positions of those primary features on the three-dimensional model as they move in the series of images. Use of an active shape model to model a subject's head, and the use of such a model in tracking an object will be apparent to those skilled in the art.

A secondary feature is a feature of an image of the head of the subject, such as a feature of an image of the series of images captured by a camera associated with a tracking system. In some embodiments, a secondary feature may include an image patch (i.e. a cropped portion of an image) which can be identified in at least some of (but preferably most or all of) the images of the series of images. A secondary feature may be extracted from, or selected in an image if it is easily distinguishable in the image, and can, therefore, be tracked from image to image in the series of images. Secondary features may be patches or portions of an image showing a facial feature that is less likely to be present on a majority of people, but which might be specific to a particular person, and might be a consistent and detectable feature of the head, such as skin lesions (e.g. skin tags, moles and birthmarks), scars, a person's hairline and portions of a person's ears. A secondary feature may alternatively include a part of an image from the series of images which contains a portion of a primary feature. For example, an image patch containing a distinctive portion of a person's mouth may be selected as a trackable secondary feature.

Referring to the drawings, FIG. 1 illustrates, schematically, a tracking apparatus 100 according to embodiments of the invention. The tracking apparatus 100 includes an imaging unit 102 and a processing unit 104. The imaging unit is capable of receiving a series of images representing at least a portion of a subject's head. For example, the imaging unit 102 may receive a series of images of a portion of a head of a user performing a personal care activity. The images may be received from a camera associated with the tracing apparatus 100. The processing unit 104 may be in communication with the imaging unit, and is configured to track the head of a user in the series of images received by the imaging unit 102. Specifically, the processing unit 104 is configured to perform the tracking method described herein.

The processing unit 104 may comprise processing apparatus such as one or more processors, or any other computing device capable of performing processing activities.

Figure 2:
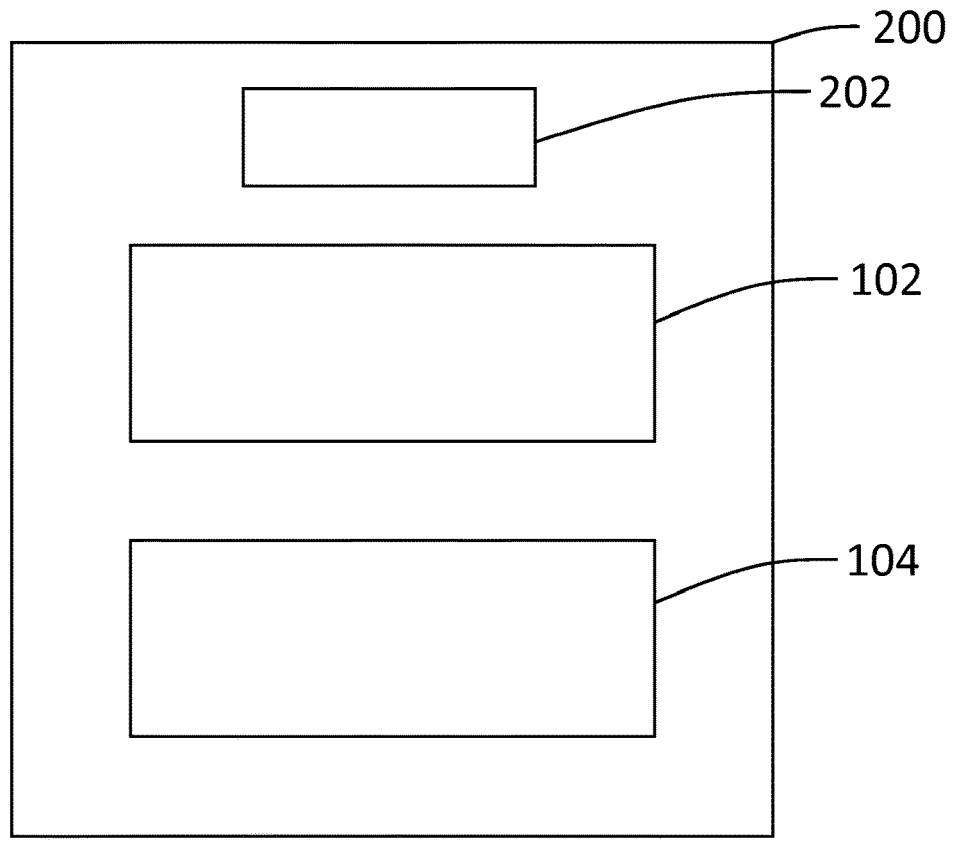
FIG. 2 is a schematic illustration of a further example of tracking apparatus according to embodiments of the invention.

FIG. 2 illustrates, schematically, a tracking apparatus 200 according to embodiments of the invention. The tracking apparatus 200 is similar to the tracking apparatus of FIG. 1. However, the tracking apparatus 200 further includes a camera 202 for capturing the image data representing at least a portion of the subject's head. The camera 202 may capture a series of images of the user's head (or a portion thereof), and send them, as they are captured, to the imaging unit 102. The tracking apparatus 100, 200 may also include a storage medium, such as a memory (not shown) for storing data relating to the received or captured images, or for storing programme code, for example software code for performing the method described herein.

The tracking apparatus 100, 200 may comprise, or may be implemented in, a device, such as a smart mirror, a tablet computer, a smartphone, a laptop computer or a desktop computer.

Figure 3:
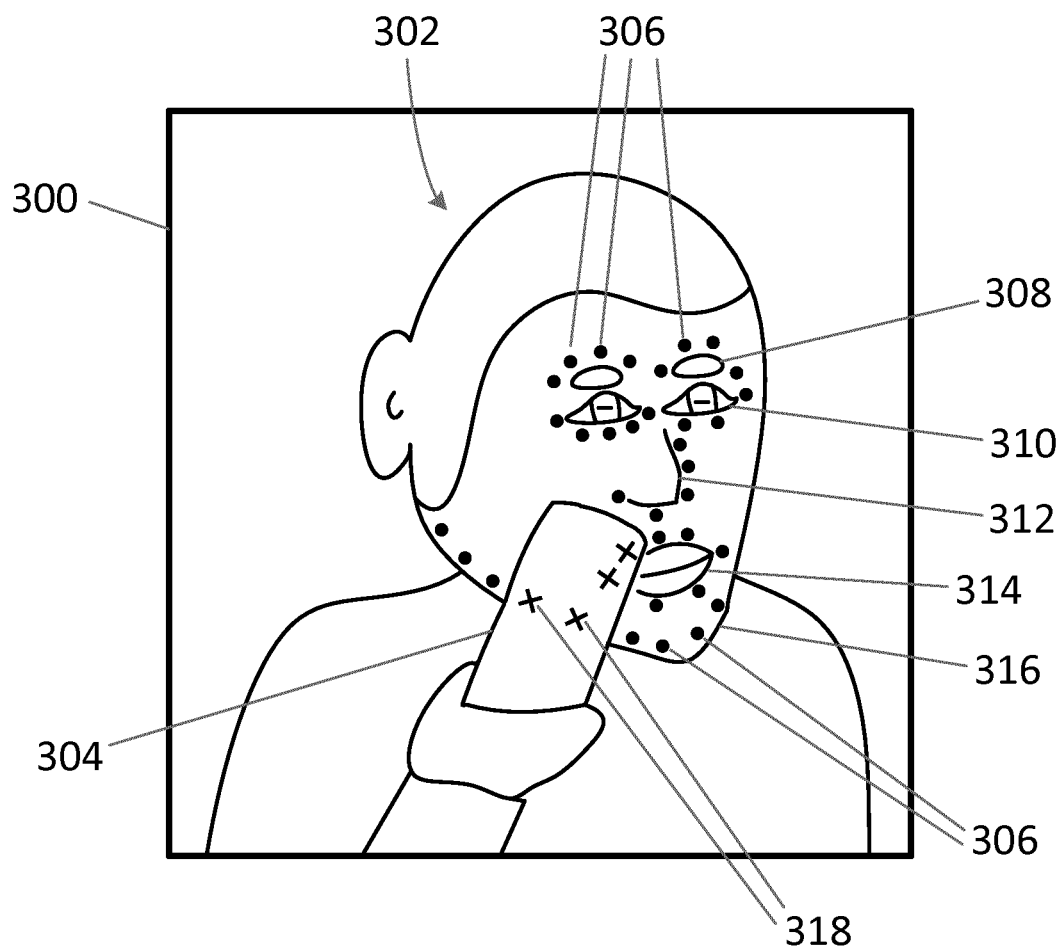
FIG. 3 is an illustration of a user performing a personal care activity.

FIG. 3 shows an image of a user performing a personal care activity which, in this example, involves trimming facial hair. The image of the user is within a frame 300, which indicates the extent of the field of view of a camera capturing the image. A user 302 is shown holding a cutting device 304 which, in this example, is a trimmer or shaver. A plurality of primary feature indicators 306 are shown as dots at various positions on the image of the user 302. Each of the primary feature indicators 306 represents a point associated with a primary feature of the head of the user 302. The primary feature indicators 306 are shown located at points along the eyebrows 308 of the user 302, around the user's eyes 310, on the user's nose 312, around the user's mouth 314, and along an edge of the user's face 316.

The primary features of the head are defined such that they are recognisable by the tracking apparatus 100, 200. In other words, the tracking apparatus 100, 200 is configured to recognise a primary feature from a defined set of primary features. In this way, the primary features may be considered to be semantic, in that a particular primary feature will always appear the same way; for example, a corner of an eye will always look like the corner of an eye. This means that the head of a person may be confidently tracked using the primary features as there is likely to be little or no uncertainty regarding the identity of a particular primary feature. Thus, when a primary feature from the set of defined primary features is detected in a captured image by the tracking apparatus 100, 200, the three-dimensional model of the head is fitted to coordinates representing the position of the detected primary feature. In some embodiments, the three-dimensional model may include (i.e. may be fitted to coordinates representing the positions of) approximately 60 primary features, and as many of the primary features as possible may be used to track the position of the head between subsequent images in the series of images.

The image shown in FIG. 3 represents one image of the series of images that may be received by the tracking apparatus 100, 200, and/or captured by a camera, such as the camera 202 of the tracking apparatus 200, for processing. Processing apparatus associated with the tracking apparatus, such as the processing unit 104, performs image processing techniques to identify one or more facial features or landmarks (308 to 314) of the user and to determine points on or around the facial features that could serve as reliable primary features to be tracked. Tracking may be performed by software operated by and/or executed by the processing unit 104. As the user 302 moves within the field of view of the camera 202 (i.e. within the frame 300), the processing apparatus tracks the primary features (identified by the primary feature indicators 306). Tracking of the primary features may be achieved using various known algorithms and/or techniques as described above, or such as image template matching, regression based methods or convolutional and/or deep neural network based algorithms.

As shown in FIG. 3, the trimmer 304 is being held between the face of the user 302 and the camera capturing the image data. As such, the trimmer 304 obscures or obstructs portions of the user's face from view of the camera. The trimmer 304 may, therefore, block from view one or more primary features of the user 302, or portions of one or more primary features. In FIG. 3, marks 318 (shown as crosses) are shown at locations where primary feature indicators 306 would have been visible if the trimmer 304 was not obscuring the face from the view of the camera. Since portions of the head of the user 302 obscured by the trimmer 304 are not visible to the camera (at least in the image frame shown in FIG. 3), the primary features (or portions thereof) on those obscured portions of the user's head that are not visible to the camera cannot be tracked using the tracking apparatus.

Figure 4:
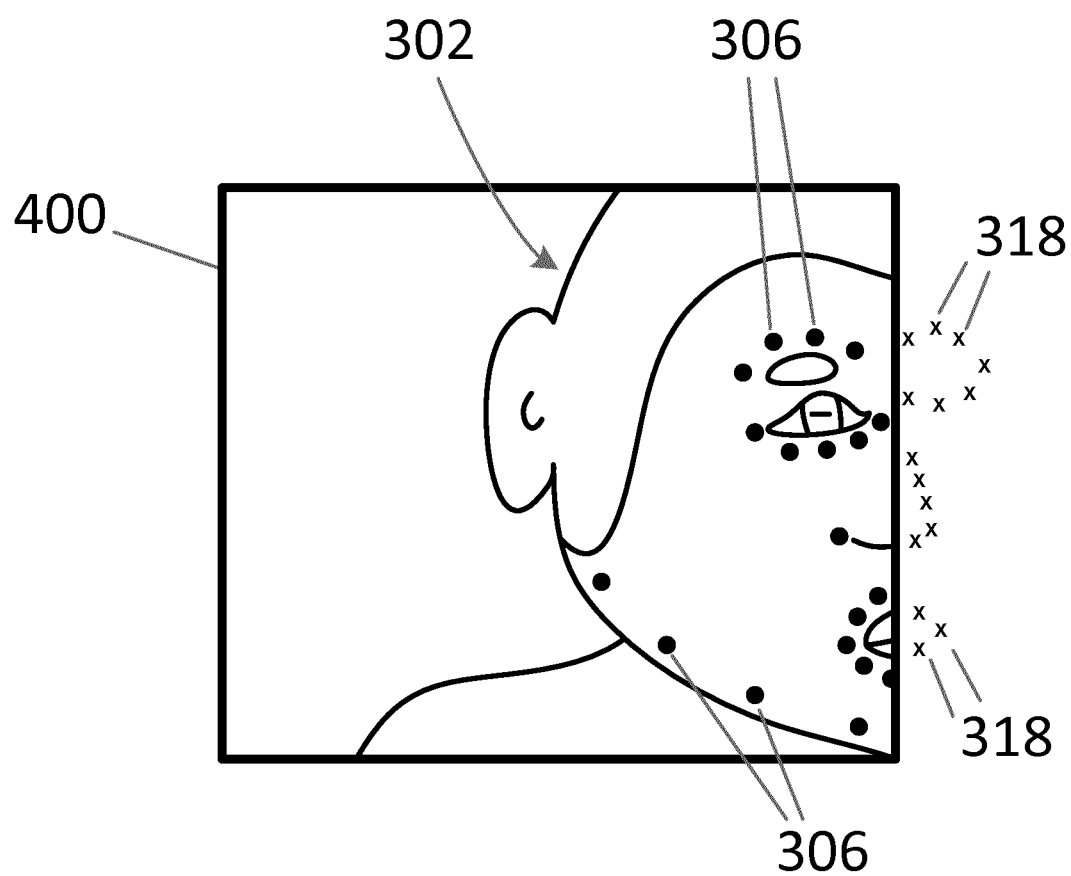
FIG. 4 is an illustration of a user partially within a field of view of a camera.

Another situation in which portions of primary features may be out of view of the camera is shown in FIG. 4. In FIG. 4, the image of the user is within a frame 400, which indicates the extent of the field of view of a camera capturing the image. In the example of FIG. 4, the user 302 has moved towards the camera and, as a result, portions of the user's face are outside the field of view of the camera (i.e. are not visible within the image frame 400). Accordingly, some of the primary features of the subject, and some of the primary feature indicators 306, are not visible to the camera. As in FIG. 3, marks 318 are shown at locations in FIG. 4 where primary feature indicators 306 would have been visible if those portions of the subject were within the field of view of the camera.

When the processing unit 104 associated with the tracking apparatus 100, 200 determines the position of each primary feature of the person's head in an image, it determines a confidence level for each determined position. A confidence level is an indication of the confidence of the processing apparatus in the accuracy of the determined position. Each confidence level may, for example, be a percentage, where 100% indicates absolute certainty in the determined position and 0% indicates no confidence in the accuracy of the determined position. A confidence level associated with a determined position of a particular primary feature (e.g. a corner of the right eye of the user 302) may be relatively high (e.g. 99.99%) if the particular primary feature is visible in the image (i.e. is within the field of view of the camera and is not obscured by any object), and/or if the other points near to or adjacent the particular primary feature (e.g. points along the edge of the right eye of the user) are also visible in the image. The confidence level of the determined position of the particular primary feature may be reduced as one or more adjacent primary features and other nearby primary features are moved out of the field of view of the camera, or are obscured by an object, such as the user's hand. In some embodiments, the defined threshold for the confidence level of the position of a primary feature may be relatively low (e.g. 99.5%), while in other embodiments, the threshold may be relatively high (e.g. 99.999%), depending on the desired accuracy of the tracking.

If the confidence level of the position of a particular primary feature of the user's head is particularly low, then the determined position of that particular primary feature may be given relatively little weight when used to track the position of the head.

The confidence levels of the determined positions of each of the primary features are used to provide a confidence level of the determined position of the user's head. For example, the confidence level of the determined position of the user's head in a particular image may, in some embodiments, be determined by calculating an average of the confidence levels for the positions of the primary features in the image. In some embodiments, the confidence level of the determined position of the user's head may be based on a combination of a subset of the confidence levels of the positions of the primary features. For example, any primary features that are obscured from view of the camera may be excluded and not used in determining the confidence level of the position of the head. Similarly, any primary features located outside the field of view of the camera will have very low associated confidence levels, and these features may also be excluded from use in determining the confidence level of the position of the head. The determination of a confidence level of the determined position of the user's head may also be based on a level of agreement between a determined position of the head (or features of the head) in a particular image and an expected position of the head (or features of the head) in the particular image based on a previously-determined position. The previously-determined position may, for example, be the position determined in the image immediately preceding the particular image.

In some embodiments, the processing unit 104 associated with the tracking apparatus 100, 200 may require the positions of a minimum number of primary features to be determined, each with a confidence level exceeding the threshold level, in order to be able to determine, and therefore track the position of the head. For example, in some embodiments, the processing unit 104 may require that the positions of ten primary features are known to a confidence level exceeding 99.9% to be able to track the user's head based on the primary features. In other embodiments, the processing unit 104 may require the positions of fewer (e.g. five) or more (e.g. fifteen) primary features to be known, depending on the desired accuracy of the tracking. If the requirements are not met, then it may not be possible to track the position of the user's head based on the primary features.

In the event that the tracking apparatus 100, 200 is unable to track the position of the user's head based on the primary features (e.g. if the confidence level of the position of the user's head is below the defined threshold), then it may switch to an alternative means for tracking the head, as discussed below. In some embodiments, the confidence level threshold below which the head position cannot be tracked using the primary features is 80%.

While the tracking apparatus 100, 200 is able to track the head of the user 302 based on the primary features (in other words, while the positions of a threshold number of primary features are known to a threshold level of confidence), the tracking apparatus detects candidate secondary features which may also or alternatively be used to track the user's head. That is to say, while there is a sufficient level of confidence in the determined positions of the primary features, the apparatus 100, 200 will track the head of the user 302 based on the primary features, but also detects patches of images in the series of images that might serve as secondary features to be used for tracking. Such candidate secondary features might include an image patch in a particular image which includes, for example, a mole or a scar on the face of the user 302, or an edge of an ear lobe of the user. However, it will be appreciated that an image patch forming a secondary feature need not necessarily include a particular feature of the subject's face or head. Any image patch containing an identifiable and trackable image feature (e.g. a contrast in colour or brightness) may form a suitable secondary feature.

In some embodiments, new candidate secondary features are identified, or spawned, in each new image in the series of images, until around 60 candidate secondary features have been identified. New candidate secondary features are selected in such a way that they are spatially distributed. In this way, if some of the secondary features are occluded from view in an image, then it is likely that there will still be sufficient secondary features visible elsewhere in the image.

Once one or more candidate secondary features have been identified in a particular image of the series of images in which the head is being tracked, the tracking apparatus 100, 200 monitors the identified candidate secondary features to track their positions in the next image in the series of images, then the next image in the series of images, and so on.

As is discussed in greater detail below, a candidate secondary feature may be accepted as one to be used for tracking the subject's head only if the confidence level associated with its position is above a defined threshold. Since the position of the candidate secondary feature is determined based on the positions of the primary features, the confidence levels of the candidate secondary features may also be considered to be based on the primary features. A secondary feature will be added to the pool of secondary features available for tracking only if its position can be verified using a primary feature. The positions of the candidate secondary features may be stored in a storage medium (not shown).

The tracking apparatus 100, 200 is able to 'learn' information about the positions of secondary features over a period of time (i.e. over a series of images) based on the positions of primary features for which confidence levels are above a threshold. For example, a candidate secondary feature may be identified in a first image of a series of images, and the position of that feature determined (e.g. its absolute coordinates in two-dimensional space in the image or its coordinates relative to the position of the head based on the primary features). The position of the candidate secondary feature may then be determined in the second image of the series of images in a number of ways, as discussed below.

The tracking apparatus uses the primary features to determine the position of the head (including all of its features, not just those features designated as primary features) in three-dimensional space (e.g. using a three-dimensional model as discussed below). The features of the head, including the primary features and the newly-identified secondary features, are projected into a two-dimensional model, and the positions of the secondary features are compared (e.g. in a pairwise manner) with two-dimensional coordinates of the secondary features being tracked, as described below. In this way, the secondary features are verified against the known primary features.

The position of the candidate secondary feature in the second image may be compared to the position that would be expected based on the movement (the new positions) of other features in the image. If the determined position of the secondary feature in the second image is as expected (e.g. based on the projected position into the two-dimensional model), then its confidence level may be increased. In this way, the tracking system can be considered to learn new secondary features (and their positions) from each subsequent image. However, the presence and the positions of secondary features in a particular image will be determined only while the confidence level in primary features in that image is high (i.e. above a threshold). If the positions of the primary features are not confidently known, then their positions will not be used to determine the positions of secondary features.

In some embodiments, a confidence level of the position of an identified candidate secondary feature in a first image of the series of images may be determined. The tracking apparatus may revise the determined confidence level of the position of the identified candidate secondary feature based on a change in the positions of the first plurality of primary features relative to the identified candidate secondary feature from the first image to a subsequent image of the series of images. In other words, the confidence in the candidate secondary feature's position may reduce over time (i.e. as one progresses through the series of images) if the change in its position is inconsistent with the change in the positions of the primary features. In some embodiments, a candidate secondary feature may be discarded altogether as a secondary feature for use in tracking the position of the head, for example if the confidence in its position reduces by a defined amount or below a defined threshold.

Tracking of the secondary features from image to image in the series of images may be achieved using one or more image processing techniques. For example, in some embodiments, template matching might be used to track the secondary features. Template matching techniques involve selecting an image patch from a first image of the series of images, such as an image patch centred on the secondary feature, and attempting to match the selected image patch with a portion of a second image in the series of images. The selected image patch may, in some embodiments, be a square patch of, for example, 32 pixels by 32 pixels, or 16 pixels by 16 pixels. The tracking apparatus may look for a particular colour or an equivalent greyscale value of the image patch in the second image and, if the image patch is identified in the second image, then the position of the secondary feature in the second image may be considered to be known. The image tracking apparatus may then look for the same image patch in subsequent images to determine the secondary feature's position.

In some embodiments, image feature matching might alternatively or additionally be used to track the secondary features. Image feature matching involves identifying one or more properties or characteristics of an image patch in the first image of the series of images. As noted above, the image patch may, in some embodiments, be a square image patch centred on the secondary feature. Such properties/characteristics include, for example, a colour in the image patch, a contrast between pixels in the image patch, or a shape of an arrangement of pixels in the image patch. A number of known image processing/feature recognition/feature tracking techniques may be used. For example, one or more techniques such as histogram of oriented gradients (HOG), local binary patterns (LBP), image gradient analysis or Haar-like feature analysis may be used to extract data, characteristics and/or properties of the image patch which can be used to track the image patch. The tracking apparatus may look in the second image for the data extracted from the image patch in the first image. If the data is identified in the second image, it is possible to determine the displacement (i.e. the movement) of the secondary feature between the two images (known as optical flow). If the displacement of the secondary feature is consistent with the displacement of primary features between the two images, then the confidence level associated with the position of the secondary feature may be improved. If a confidence level of the secondary feature is high enough (e.g. above a threshold), and the position of the secondary feature is consistent with the positions of primary features, then the tracking apparatus may extract additional data from the image patch in the second image, for example using one or more of the techniques mentioned above. In this way, image data (i.e. characteristics and/or properties) relating to the image patch can be stored (for example in a memory) and built up over time (i.e. over a series of images), but only while confidence in secondary feature's position, relative to primary features, is sufficiently high. If sufficient data relating to an image patch surrounding a secondary feature is accumulated, or learnt, then the tracking apparatus may use the data to detect the secondary feature in an image at some later time. For example, a secondary feature may be identified and image data relating to the image patch associated with the secondary feature may be accumulated. However, that particular secondary feature may move outside the field of view of the camera for a period of time (e.g. while a user temporarily turns their head to one side). The tracking apparatus is able to search all subsequent images for the properties/characteristics of the image patch such that, if the secondary feature comes back into the field of view of the camera in a later image/frame, the secondary feature can be identified. In this way, the secondary feature may again be accepted as a reliable feature of the head to track.

Thus, the tracking apparatus may monitor, over a plurality of images in the series of images, a position of a candidate secondary feature relative to one or more of the first plurality of primary features. Upon determining that (i) the position of the candidate secondary feature relative to the one or more primary features is consistent over the plurality of images, and (ii) the first confidence level is above a defined threshold, the tracking apparatus extracts, from a first image of the series of images, data identifying at least one characteristic relating to an image patch containing the candidate secondary feature. The data may be stored for later use.

The tracking apparatus may use the stored data to identify, based on the at least one characteristic, the image patch in a second, later image of the series of images.

In some embodiments, once a secondary feature has been detected for a second (or subsequent) time (e.g. when the feature comes back into the field of view of the camera), the tracking system checks the position of the secondary feature relative to the positions of one or more primary features. If the position of the secondary feature is positioned as expected, such as in the same relative position as it was before the feature moved out of the field of view, then the secondary feature (and its position) can be verified. This may act as a second stage of a verification to confirm the suitability of the secondary feature for tracking.

In general, the tracking apparatus may monitor a position of a potential secondary feature relative to one or more primary features only if the positions of the one or more primary features are known with a confidence level above a defined threshold.

Other image processing and feature tracking/matching techniques are also envisaged.

In some embodiments, secondary features may be tracked from image to image in the series of images by analysing the change in the position of the secondary feature being tracked between images in the series of images, relative to other secondary and/or primary features. For example, the tracking system may track the position of an image patch between sequential images in the series of images by determining its position in the images relative to one or more primary and/or secondary features whose positions have been determined with a confidence level exceeding the threshold level. The movement of a secondary feature relative to other features may also be used to increase or decrease the confidence level associated with the position of a secondary feature. For example, if the position of a particular secondary feature changes consistently between images relative to other features in the images, then the confidence level associated the feature may be increased. Similarly, if the position of the particular secondary feature changes between images, but the positions of other features in the image do not move in a consistent manner, then confidence level associated with the position of that particular secondary feature may be reduced. Such a reduction in the confidence level may be indicative that the particular secondary feature is not a trackable feature of the user's head, but is instead, a feature of something else moving in the image, such as the trimmer 304, for example.

In some embodiments, monitoring the positions of the secondary features is achieved according to the following example. When a candidate secondary feature is identified in a captured image, it is "marked" on the three-dimensional model of the head. Any movement of the head between subsequent captured images (e.g. a first image and a second image) is tracked in the three-dimensional model based on the movement of the primary features, as described above. Movement of the candidate secondary features marked on the three-dimensional model is predicted based on the movement of the model. Therefore, in the second image, the tracking apparatus assumes a location for each of the candidate secondary features that have been marked on the three-dimensional model. The locations of the candidate secondary features are projected into two-dimensions (i.e. projected to a two-dimensional model of the head). The movement of the candidate secondary features is also detected in the captured image, for example using optical flow measurement techniques. The positions of the candidate secondary features in the second captured image are compared with the assumed/expected positions of the candidate secondary features which have projected in two-dimensions. If the comparison shows that a candidate secondary feature is in the same position in both the second captured image and the projected two-dimensional image (within a defined error range), then the candidate secondary features is retained. However, if the position of a candidate secondary feature differs by more than the defined error range, then the candidate secondary feature may be discarded as a possible secondary feature for tracking the head. In some embodiments, the defined error range is 1 millimetre, or an equivalent number of pixels. The equivalent number of pixels depends on the resolution of the camera and the distance from the camera to the head being tracked. Thus, the tracking apparatus 100, 200, or the processor thereof, may fit a three-dimensional model of the subject's head to coordinates representing the positions of the primary. The position of the three-dimensional model may then be updated (e.g. by adjusting parameters of the model) based on the positions of the primary features obtained from a first image and a second, later image in the plurality of images. The position of the candidate secondary feature in the three dimensional model may then be predicted based on the positions of the primary features in the model.

In some embodiments, if a candidate secondary feature is retained following its movement between subsequent captured images, then the confidence in the position of that candidate secondary feature increases. A counter may be used to count the number of subsequent images in which the candidate secondary feature has remained. The higher the count, the greater the confidence in the candidate secondary feature. In some embodiments, only those candidate secondary features with the highest counts (i.e. those candidate secondary features whose positions have been determined accurately for the greatest number of subsequent images) are used as secondary features for tracking purposes. In this way, the number of subsequent images in which the candidate secondary feature has remained (i.e. the number counted by the counter) can be considered to be a confidence level of the position of the candidate secondary feature. Thus, if the confidence level of the position of the candidate secondary feature is determined to be below a defined threshold, the candidate secondary feature may be discarded as a potential secondary feature to be used for tracking the subject's head. On the other hand, if the confidence level of the position of the candidate secondary feature is determined to be above the defined threshold, the candidate secondary feature may be retained and used as a secondary feature for tracking the head, if needed.

Thus, the tracking apparatus 100, 200 or the processor thereof may compare the predicted position of the candidate secondary feature in the three-dimensional model with a position of the candidate secondary feature determined from image feature tracking analysis of the first and second images. A confidence level of the position of the candidate secondary feature may be increased if the predicted position is within a defined distance of the position determined from the image feature tracking analysis. In some embodiments, the image feature tracking analysis may comprise optical flow analysis. The defined distance, which may be a two-dimensional Euclidian displacement, calculated by projecting the three-dimensional model to a two-dimensional image, may be 1 millimetre (or an equivalent number of pixels), as discussed above.

In the event that the position of the head cannot be confidently determined from the positions of the primary features, then tracking of the head is performed based on the positions of the secondary features, the confidence of which has been built up while tracking the primary features. When tracking of the subjects head is performed based on the secondary features, then the three-dimensional model of the head is fitted to coordinates representing the secondary features, rather than the coordinates representing the primary features.

Figure 5:
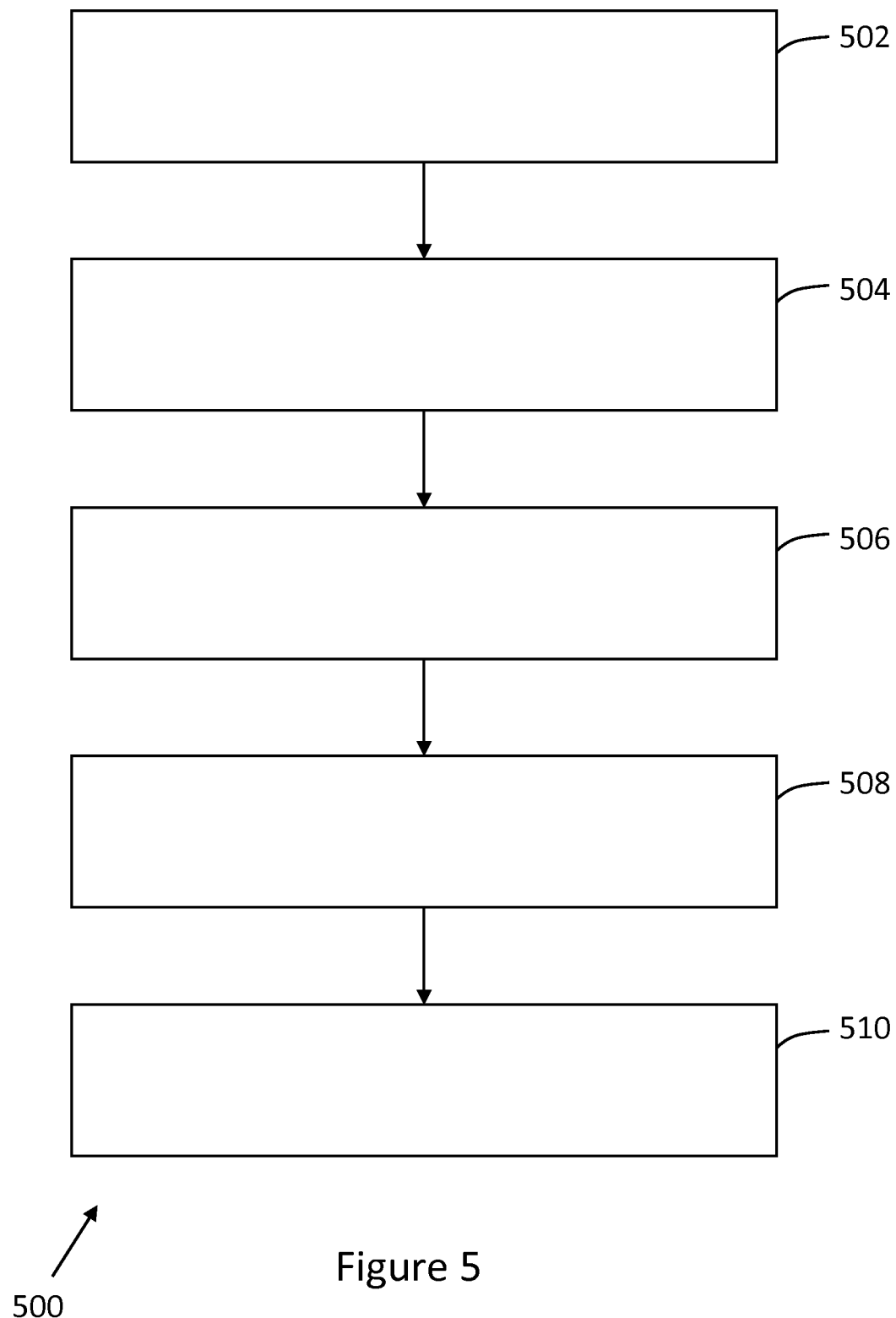
FIG. 5 is a flowchart of an example of a method for tracking a head of a subject.

Parts of the method described above are depicted in a flowchart in FIG. 5. The flowchart of FIG. 5 is an example of a method 500 of tracking a head of a subject in a series of images. The method comprises, at step 502, receiving a series of images of at least a portion of a subject's head. As noted above, the images may be received by the imaging unit 102 of the tracking apparatus 100, 200, and may be captured by a camera 202 associated with the tracking apparatus. In some embodiments, the method may comprise receiving data describing a set of defined primary features of the subject's head. At step 504, the method comprises tracking a position of the subject's head in the series of images based on positions of a first plurality of primary features of the subject's head. The method comprises, at step 506, determining a first confidence level of the position of the subject's head based on the positions of the first plurality of primary features. At step 508, the method comprises monitoring a position of a secondary feature. The processing unit 104 may compare the first confidence level to a defined threshold level. Upon determining that the first confidence level is below a defined threshold, the method comprises tracking the position of the subject's head based on the position of the secondary feature rather than the positions of the primary features (step 510). The position of the secondary feature may be monitored relative to one or more of the first plurality of primary features.

Figure 6:
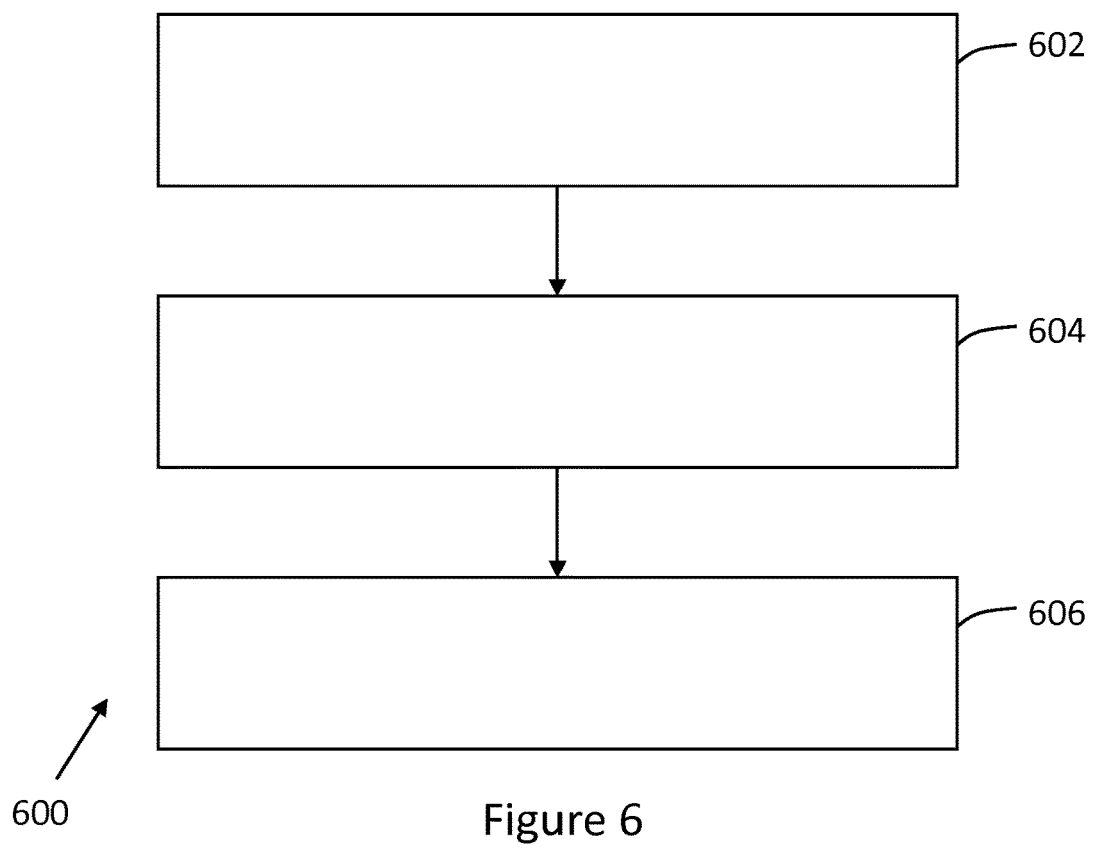
FIG. 6 is a flowchart of a further example of a method for tracking a head of a subject.

FIG. 6 is a flowchart of a further example method 600 of tracking a head of a subject in a series of images. While the tracking apparatus 100, 200 is tracking the head of the user 302 based on the positions of the secondary feature or features, the apparatus may, in some embodiments, monitor positions of a second plurality of primary features of the subject's head (step 602). In some embodiments, the apparatus may continue to monitor the positions of as many of the primary features as possible. The monitored primary features may be the same primary features as have been tracked previously by the system, or they may be a different plurality of primary features, the positions of which have not been previously monitored or tracked. In step 604, the tracking apparatus 100, 200 may determine a confidence level of the position of each monitored primary feature (i.e. the second plurality of primary features). The confidence levels of the positions of the monitored primary features may be used to calculate or determine a confidence level of the position of the user's head based on the monitored primary features. Thus, if the positions of a sufficient number (i.e. above a defined threshold) of primary features are determined with a confidence level above a defined threshold, then it may be possible for the position of the head of the user 302 to be determined with a confidence level that exceeds a threshold level. If it is determined that the confidence level of the position of the head based on the monitored primary features is above the threshold, then the tracking apparatus 100, 200 may switch back to tracking the user's head based on the positions of the monitored primary features rather than based on the positions of the secondary features (step 606).

Figure 7:
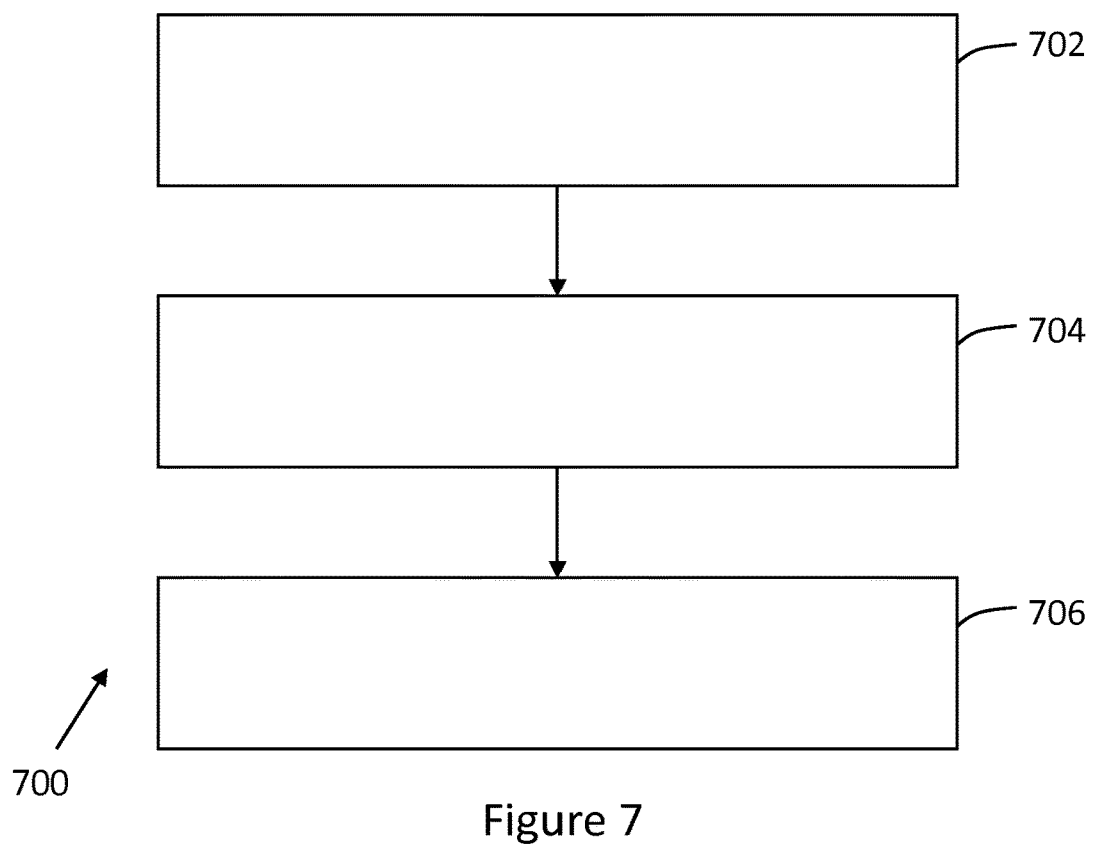
FIG. 7 is a flowchart of a further example of a method for tracking a head of a subject.

FIG. 7 is a flowchart of a further example method 700 of tracking a head of a subject in a series of images. As noted above, while tracking the position of the subject's head based on the positions of the primary features, the method may identify a candidate secondary feature as a potential secondary feature to be used for tracking the subject's head (step 702). In some embodiments, the tracking apparatus 100, 200 determines a confidence level for the position of the candidate secondary feature (step 704) based on the position of one or more of the first plurality of primary features. If a candidate secondary feature remains clearly visible and identifiable over a plurality of images in the series of images, then the confidence level of that feature's position may increase. If the confidence level assigned to the position of a particular candidate secondary feature is above a defined threshold, then that particular candidate secondary feature may be accepted as a trackable secondary feature and, therefore, may be used to track the head of the user 302, if needed. If, while monitoring the candidate secondary feature, which has been accepted as a trackable feature, it is determined the confidence level assigned to its position reduces to below the defined threshold, then the tracking apparatus 100, 200 may reject that candidate secondary feature as being unsuitable for tracking. In other words, the tracking apparatus may discard that candidate secondary feature as a potential secondary feature to be used for tracking the subject's head.

If the tracking apparatus 100, 200 determines that the position of the user's head cannot be determined to a satisfactory confidence level based on the positions of the primary features, and the apparatus is unable to determine the positions of a sufficient number of secondary features to a satisfactory confidence level, then the apparatus may conclude that the head of the user 302 cannot be tracked until additional position data is obtained. In such a scenario, the processing unit 104 associated with the tracking apparatus 100, 200 may, in some embodiments, inform the user that the position of his or her head cannot be tracked. For example, a message may be displayed to the user, requesting the user to move into the field of view of the camera, or to move into such a position that more primary features of the user's head are visible to the camera.

The invention also relates to a processing unit configured to perform the tracking method described herein. The processing unit may comprise the processing unit 104 of FIGS. 1 and 2.

Figure 8:
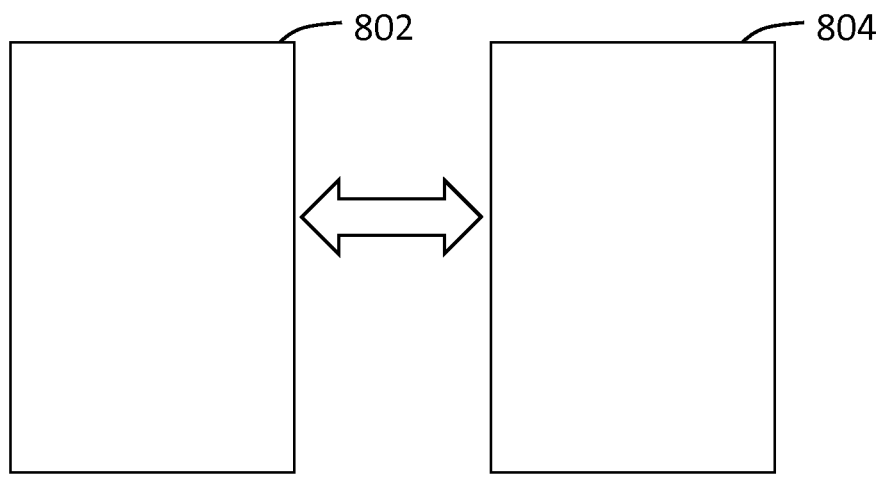
FIG. 8 is a schematic of an example machine readable medium with a processor.

The invention also relates to a machine-readable medium, as shown schematically in FIG. 8. FIG. 8 shows an example machine readable medium 802 with a processor 804, such as the processing unit 104. The machine-readable medium 802 comprises instructions which, when executed by the processor 804, cause the processor to track a position of a subject's head in a series of images based on positions of a first plurality of primary features of the subject's head; determine a first confidence level of the position of the subject's head based on the positions of the first plurality of primary features; and, upon determining that the first confidence level is below a defined threshold, track the position of the subject's head based on a position of a secondary feature rather than the positions of the primary features.

The machine-readable medium 802 may also comprise instructions which, when executed by a processor, cause the processor to monitor positions of a second plurality of primary features of the subject's head while tracking the position of the subject's head based on the position of the secondary feature; determine a second confidence level of the position of the subject's head based on the positions of the second plurality of primary features; and, upon determining that the second confidence level is above a defined threshold, track a position of the subject's head based on the positions of the second plurality of primary features rather than the position of the secondary feature.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:
1. A method for tracking a head of a subject in a series of images, the method comprising acts of:
receiving a series of images of at least a portion of a subject's head;
tracking a position of the subject's head in the series of images based on positions of a first plurality of primary features of the subject's head;
determining a first confidence level of the position of the subject's head based on the positions of the first plurality of primary features;
monitoring a position of a secondary feature; and
upon determining that the first confidence level is below a defined threshold, tracking the position of the subject's head based on the position of the secondary feature rather than the positions of the first plurality of primary features, wherein the secondary feature includes at least one feature specific to the head of the subject and not present in heads of all people.

2. The method according to claim 1, wherein, for a particular image in the series of images, the first confidence level is based on a combination of confidence levels of the first plurality of primary features.

3. The method according to claim 1, further comprising an act of:
during said tracking the position of the subject's head based on the positions of the first plurality of primary features, identifying a candidate secondary feature as a potential secondary feature to be used for tracking the subject's head.

4. The method according to claim 1, wherein each primary feature comprises one of: a portion of an eye, a portion of a nose, a portion of a mouth, a portion of an eyebrow, and a portion of a chin.

5. The method according to claim 1, wherein the secondary feature comprises a portion of an image of the received series of images.

6. The method according to claim 1, wherein tracking the position of the subject's head based on the position of the secondary feature comprises applying at least one of a template matching technique and an image feature matching technique.

7. A processor configured to perform the method of claim 1.

8. An apparatus for tracking a head of a subject, the system comprising:
an imager configured to receive a series of images representing at least a portion of a subject's head; and
a processing unit according to claim 7.

9. The apparatus according to claim 8, further comprising:
a camera for capturing the image data representing at least a portion of the subject's head.

10. The apparatus according to claim 8, wherein the apparatus comprises one of a smart mirror, a tablet computer, a smartphone, a laptop computer and a desktop computer.

11. A method for tracking a head of a subject in a series of images, the method comprising acts of:
receiving a series of images of at least a portion of a subject's head;
tracking a position of the subject's head in the series of images based on positions of a first plurality of primary features of the subject's head;
determining a first confidence level of the position of the subject's head based on the positions of the first plurality of primary features;
monitoring a position of a secondary feature;
upon determining that the first confidence level is below a defined threshold, tracking the position of the subject's head based on the position of the secondary feature rather than the positions of the first plurality of primary features;
during said tracking the position of the subject's head based on the position of the secondary feature, monitoring positions of a second plurality of primary features of the subject's head;
determining a second confidence level of the position of the subject's head based on the positions of the second plurality of primary features; and
upon determining that the second confidence level is above a defined threshold, tracking a position of the subject's head based on the positions of the second plurality of primary features rather than the position of the secondary feature.

12. A method for tracking a head of a subject in a series of images, the method comprising acts of:
receiving a series of images of at least a portion of a subject's head;
tracking a position of the subject's head in the series of images based on positions of a first plurality of primary features of the subject's head;
determining a first confidence level of the position of the subject's head based on the positions of the first plurality of primary features;
monitoring a position of a secondary feature;
upon determining that the first confidence level is below a defined threshold, tracking the position of the subject's head based on the position of the secondary feature rather than the positions of the first plurality of primary features;
during said tracking the position of the subject's head based on the positions of the first plurality of primary features, identifying a candidate secondary feature as a potential secondary feature to be used for tracking the subject's head;
determining a confidence level of a position of the candidate secondary feature based on at least one of the positions of the first plurality of primary features; and
upon determining that the confidence level of the position of the candidate secondary feature is below a defined threshold, discarding the candidate secondary feature as a potential secondary feature to be used for tracking the subject's head.

13. A method for tracking a head of a subject in a series of images, the method comprising acts of:
receiving a series of images of at least a portion of a subject's head;
tracking a position of the subject's head in the series of images based on positions of a first plurality of primary features of the subject's head;
determining a first confidence level of the position of the subject's head based on the positions of the first plurality of primary features;
monitoring a position of a secondary feature;
upon determining that the first confidence level is below a defined threshold, tracking the position of the subject's head based on the position of the secondary feature rather than the positions of the first plurality of primary features;
during said tracking the position of the subject's head based on the positions of the first plurality of primary features, identifying a candidate secondary feature as a potential secondary feature to be used for tracking the subject's head;
fitting a three-dimensional model of the subject's head to coordinates representing the positions of the primary features;
updating the position of the three-dimensional model based on the first plurality of positions of the primary features obtained from a first image and a second, later image in the plurality of images; and
predicting a position of the candidate secondary feature in the three dimensional model based on the first plurality of positions of the primary features in the model.

14. The method according to claim 13, further comprising acts of:
comparing the predicted position of the candidate secondary feature in the three dimensional model with a position of the candidate secondary feature determined from image feature tracking analysis of the first and second images; and increasing a confidence level of the position of the candidate secondary feature if the predicted position is within a defined distance of the position determined from the image feature tracking analysis.

15. A non-transitory machine-readable medium comprising instructions which, when executed by a processor, cause the processor to:

track a position of a subject's head in a series of images based on positions of a first plurality of primary features of the subject's head;

determine a first confidence level of the position of the subject's head based on the positions of the first plurality of primary features; and upon determining that the first confidence level is below a defined threshold, track the position of the subject's head based on a position of a secondary feature rather than the positions of the first plurality of primary features, wherein the secondary feature includes at least one feature specific to the head of the subject and not present in heads of all people.

16. The non-transitory machine-readable medium of claim 15, wherein the instructions which, when executed by a processor, further cause the processor to:

during said tracking the position of the subject's head based on the position of the secondary feature, monitor positions of a second plurality of primary features of the subject's head;

determine a second confidence level of the position of the subject's head based on the positions of the second plurality of primary features; and upon determining that the second confidence level is above a defined threshold, track a position of the subject's head based on the positions of the second plurality of primary features rather than the position of the secondary feature.

17. The non-transitory machine-readable medium of claim 15, wherein the instructions which, when executed by a processor, further cause the processor to:

during said tracking the position of the subject's head based on the positions of the first plurality of primary features, identify a candidate secondary feature as a potential secondary feature to be used for tracking the subject's head.

18. The non-transitory machine-readable medium of claim 17, wherein the instructions which, when executed by a processor, further cause the processor to:

determine a confidence level of a position of the candidate secondary feature based on at least one of the positions of the first plurality of primary features; and upon determining that the confidence level of the position of the candidate secondary feature is below a defined threshold, discard the candidate secondary feature as a potential secondary feature to be used for tracking the subject's head.

19. The non-transitory machine-readable medium of claim 17, wherein the instructions which, when executed by a processor, further cause the processor to:

fit a three-dimensional model of the subject's head to coordinates representing the positions of the primary features;

update the position of the three-dimensional model based on the first plurality of positions of the primary features obtained from a first image and a second, later image in the plurality of images; and predict a position of the candidate secondary feature in the three dimensional model based on the first plurality of positions of the primary features in the model.

20. The non-transitory machine-readable medium of claim 19, wherein the instructions which, when executed by a processor, further cause the processor to:

compare the predicted position of the candidate secondary feature in the three dimensional model with a position of the candidate secondary feature determined from image feature tracking analysis of the first and second images; and increase a confidence level of the position of the candidate secondary feature if the predicted position is within a defined distance of the position determined from the image feature tracking analysis.

\* \* \* \* \*